US008718689B2

(12) United States Patent
Gao et al.

(10) Patent No.: US 8,718,689 B2
(45) Date of Patent: May 6, 2014

(54) METHOD FOR DISPLAYING RELATED INFORMATION AND MOBILE COMMUNICATION TERMINAL

(75) Inventors: Wei Gao, Shenzhen (CN); Qinghua Yang, Shenzhen (CN); Huitao Cao, Shenzhen (CN); Xiaodong Geng, Shenzhen (CN); Mingwang Zhang, Shenzhen (CN); Wencai Dong, Shenzhen (CN); Weiwei Luo, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/491,262

(22) Filed: Jun. 7, 2012

(65) Prior Publication Data
US 2012/0244894 A1    Sep. 27, 2012

Related U.S. Application Data

(63) Continuation of application No. PCT/CN2010/076750, filed on Sep. 9, 2010.

(30) Foreign Application Priority Data

Dec. 7, 2009   (CN) .......................... 2009 1 0188636

(51) Int. Cl.
*H04W 4/00* (2009.01)
(52) U.S. Cl.
USPC ........ 455/466; 455/412; 455/415; 455/414.3; 455/414.1; 455/411; 455/418; 455/410; 455/566; 455/569.1
(58) Field of Classification Search
USPC ........ 455/466, 412, 415, 414.3, 414.1, 569.1, 455/41.2, 418, 412.1, 566, 411, 410, 419; 396/310, 429; 715/764, 769, 835; 709/206, 204
See application file for complete search history.

(56) References Cited

U.S. PATENT DOCUMENTS

| 7,831,141 B2 * | 11/2010 | Wassingbo et al. ........... 396/429 |
| 2006/0170669 A1 * | 8/2006 | Walker et al. ................. 345/418 |

(Continued)

FOREIGN PATENT DOCUMENTS

| CN | 1274248 A | 11/2000 |
| CN | 1509107 A | 6/2004 |

(Continued)

OTHER PUBLICATIONS

Copy of International Search Report and Written Opinion of the International Searching Authority issued in corresponding PCT Patent Application No. PCT/CN2010/076750, mailed Dec. 16, 2010.

(Continued)

*Primary Examiner* — Joseph Arevalo
(74) *Attorney, Agent, or Firm* — Brinks Gilson & Lione

(57) ABSTRACT

A method for displaying related information in a mobile communication terminal includes: acquiring information of the contact stored in the mobile communication terminal, searching for media information in the mobile communication terminal according to the information of the contact and acquiring media information matched with the information of the contact, and displaying the media information matched with the information of the contact. The method and terminal involved in the present invention enable a mobile communication terminal user to search for media information related to a contact through the contact and meanwhile can further view the information of the contact related to the media information through the media information, by associating media files with contacts.

4 Claims, 3 Drawing Sheets

(56) References Cited

U.S. PATENT DOCUMENTS

| | | |
|---|---|---|
| 2006/0294465 A1* | 12/2006 | Ronen et al. .................. 715/706 |
| 2008/0240702 A1* | 10/2008 | Wassingbo et al. ........... 396/310 |
| 2008/0250066 A1* | 10/2008 | Ekstrand et al. ........... 707/104.1 |
| 2008/0309617 A1 | 12/2008 | Kong et al. |
| 2009/0023472 A1 | 1/2009 | Yoo et al. |
| 2010/0144323 A1* | 6/2010 | Collins et al. ............... 455/414.1 |
| 2010/0241719 A1* | 9/2010 | Dominguez et al. .......... 709/206 |
| 2010/0262928 A1* | 10/2010 | Abbott .......................... 715/769 |
| 2010/0309282 A1* | 12/2010 | Hsieh .......................... 348/14.01 |
| 2011/0045811 A1* | 2/2011 | Kemery ........................ 455/418 |
| 2011/0065419 A1* | 3/2011 | Book et al. .................... 455/411 |
| 2011/0093266 A1* | 4/2011 | Tham ............................ 704/246 |

FOREIGN PATENT DOCUMENTS

| | | | |
|---|---|---|---|
| CN | 1777206 | A | 5/2006 |
| CN | 101741973 | A | 6/2010 |
| EP | 1677497 | A1 | 7/2006 |
| JP | 11041339 | A | 2/1999 |
| JP | 2006191531 | A | 7/2006 |

OTHER PUBLICATIONS

Copy of Office Action issued in corresponding Chinese Patent Application No. 200910188636.2, mailed Dec. 23, 2011.

Copy of Office Action issued in corresponding Chinese Patent Application No. 200910188636.2, mailed Oct. 10, 2012.

Copy of Office Action issued in corresponding Chinese Patent Application No. 200910188636.2, mailed May 9, 2013, 8 pages.

Copy of Office Action issued in corresponding Japanese Patent Application No. 2012-542346, mailed Aug. 6, 2013, 5 pages.

Copy of Extended European Search Report issued in corresponding European Patent Application No. 10835415.0, mailed Aug. 28, 2013, 7 pages.

* cited by examiner

METHOD FOR DISPLAYING RELATED INFORMATION AND MOBILE COMMUNICATION TERMINAL

CROSS-REFERENCE TO RELATED APPLICATIONS

This application is a continuation of International Application No. PCT/CN2010/076750, filed on Sep. 9, 2010, which claims priority to Chinese Patent Application No. 200910188636.2, filed on Dec. 7, 2009, both of which are hereby incorporated by reference in their entireties.

FIELD OF THE APPLICATION

The application relates to mobile communication, and more particularly, to a method for displaying related information and mobile communication terminal.

BACKGROUND

Nowadays, multimedia mobile communication terminals such as mobile phones have become increasingly popular. At present, the mobile phones are capable of associating a picture, an audio ringtone or a video ringtone with each contact, and when a contact calls, a corresponding ringtone is played and/or a corresponding picture is displayed.

However, in the above design, a mobile phone user is unable to search for, browse and manage all the media files including a picture and audio/video files, associated with a certain contact through a telephone book. Meanwhile, the mobile phone user can only view a picture or audio/video files associated with a contact through the contact, while cannot view information of the contact associated with the media files when browsing the media files.

SUMMARY

The main purpose of embodiments of the present application is to provide a method for displaying related information in a mobile communication terminal and the mobile communication terminal, which enables a mobile terminal user to search for media information related to a contact through the contact, and meanwhile can further view information of the contact associated with the media information through the media information.

In order to solve the above technical problem, in an aspect according to the embodiments, a method for displaying related information in a mobile communication terminal is provided, which comprises:

acquiring information of a contact stored in the mobile communication terminal;

searching for media information in the mobile communication terminal according to the information of the contact, and acquiring media information matched with the information of the contact; and displaying the media information matched with the information of the contact.

In another aspect, a mobile communication terminal is provided, which comprises:

a first acquiring unit configured to acquire information of a contact stored in the mobile communication terminal;

a second acquiring unit configured to search for media information in the mobile communication terminal according to the information of the contact, and acquire media information matched with the information of the contact; and a display unit configured to display the media information matched with the information of the contact.

It can be seen from the above technical solution that the embodiments enable a mobile communication terminal user to search for media information related to a contact through the contact and meanwhile can further view information of the contact associated with the media information through the media information, by associating media information with contacts.

BRIEF DESCRIPTION OF THE DRAWINGS

In order to more clearly illustrate technical solutions of embodiments or in the prior art, accompany drawings which need to be used in the description of the embodiments or the prior art will be simply introduced. Obviously, the accompany drawings in the following description are merely some embodiments, and for those of ordinary skill in the art, other embodiments can further be obtained according to these accompany drawings without contributing any creative work.

DETAILED DESCRIPTION

The technical solutions of embodiments will be clearly and fully described hereinafter in combination with accompanying drawings. The described embodiments are merely exemplary. Based on the embodiments, all the other embodiments obtained by those of ordinary skill in the art without contributing any creative work are understood to fall within the protection and scope of the claims.

Disclosed below is a method for displaying related information in a mobile communication terminal and the mobile communication terminal, which enables a mobile communication terminal user to search for media information related to a contact through the contact and meanwhile can further view information of the contact associated with the media information through the media information, by associating media information with contacts.

The embodiments will be further described in detail in combination with the accompanying drawings hereinafter. In order to make the description more clear, the embodiments will be specifically illustrated by example of a mobile phone.

Figure 1:
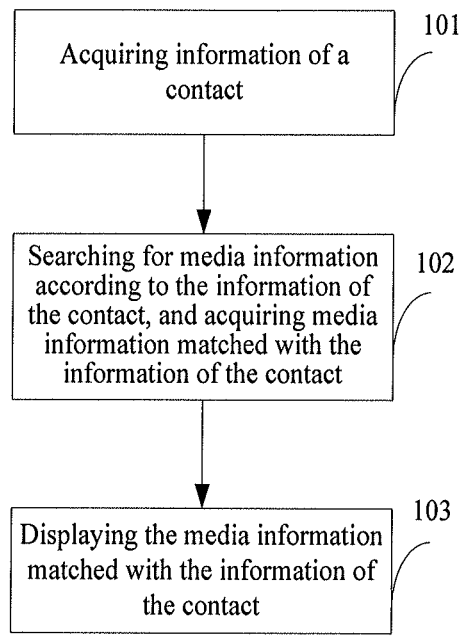
FIG. 1 illustrates a diagram of a method according to an embodiment.

As shown in FIG. 1, a flowchart of a method according to an embodiment is illustrated.

101, Acquiring information of a contact.

The information of the contact can be acquired through a telephone book, and the information of the contact may be any or any combination of a name, a nick name and a telephone number of a contact or a related person.

102, Searching for media information according to the information of the contact, and acquiring media information matched with the information of the contact.

When storing media information such as photos, audio files, video files and media file database, a user can store the information of the contact associated with the media information with the media information. The above information of the contact can be stored in a newly added field of the media information. For example, for a JPEG picture, a field definition which is unused currently, such as FF AC, can be added as a contact field, and the information of the contact associated with the media information can be stored in the field. A size of the field can be self-defined, such as 65535, which can store information of one or more contacts.

Most of the multimedia mobile phones have managed files on the mobile phones by means of database. Database generally includes basic information of files such as file names, file types, file sizes, creation dates and modification dates etc., and specific attributes of media files such as artists and albums etc. A "contact" field can be added in the database, and the information of the contact associated with the media file can be stored in the field.

A plurality of contacts may correspond to one media file. For a media file which has been associated with a contact, operations such as adding, modifying and editing etc. can also be performed on the information of the contact in the contact field of the media file.

With the information of the contact, a mobile phone user can discover media information associated with the contact, such as a name, a size, creation time, modification time and a brief description etc. of the media file associated with the contact.

103, Displaying the media information matched with the information of the contact.

After acquiring the media information matched with the information of the contact, the media information is displayed in a predetermined format. The predetermined format can be a default display format for a mobile phone, or can be selected and set by a mobile phone user according to a plurality of pre-stored formats.

In the present embodiment, when browsing a media file, a user can further view information of a contact associated with the media file through the media file, and meanwhile can send a short message or initiate a call to the associated contact.

For example, user A browses picture B and views information of contacts C1-Cn associated with the picture B through the picture B. Meanwhile, user A can send short messages to a group of the contacts C1-Cn or initiate a call to one of the contacts C1-Cn through the association.

It can be seen from the above description that one method according to an embodiment enables a mobile communication terminal user to search for media information related to a contact through the contact and meanwhile can further view information of the contact associated with the media information through the media information, by associating media information with contacts.

Figure 2:
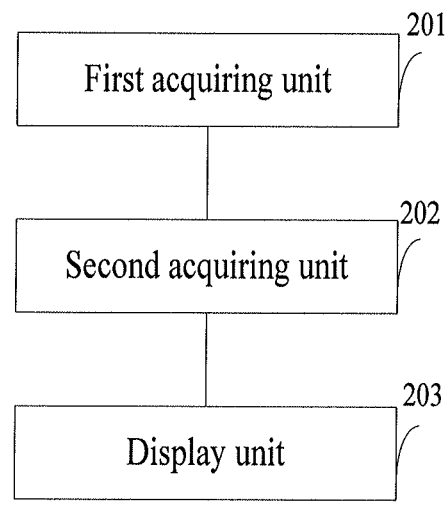
FIG. 2 illustrates a diagram of a mobile communication terminal according to an embodiment.

As shown in FIG. 2, a diagram of a terminal according to an embodiment is illustrated. The terminal includes a first acquiring unit 201, a second acquiring unit 202 and a display unit 203. The first acquiring unit is configured to acquire information of a contact stored in the mobile communication terminal. The second acquiring unit is configured to search for media information in the mobile communication terminal according to the information of the contact and acquire media information matched with the information of the contact. The display unit is configured to display the media information matched with the information of the contact.

Figure 3:
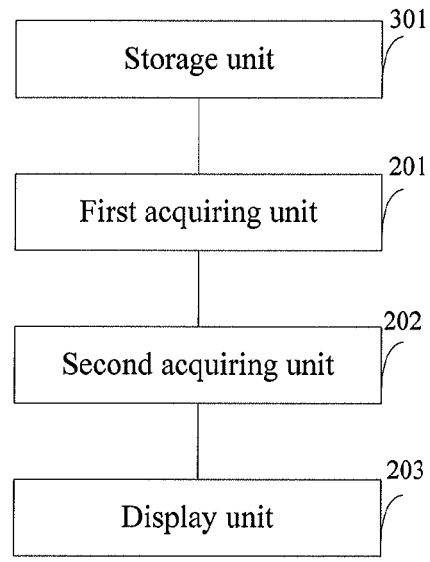
FIG. 3 illustrates a diagram of another mobile communication terminal according to an embodiment.

As shown in FIG. 3, another terminal according to an embodiment can further comprise a storage unit 301, which is configured to store information of corresponding contacts in the media information when storing the media information. The corresponding contacts can be one or more contacts.

Figure 4:
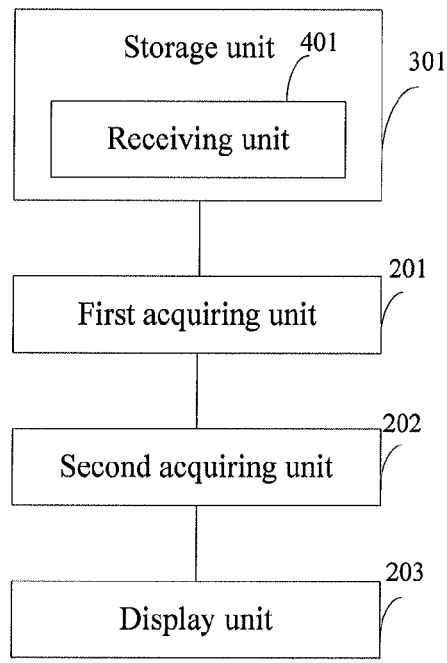
FIG. 4 illustrates a diagram of another mobile communication terminal according to an embodiment.

As shown in FIG. 4, a storage unit of another terminal according to an embodiment can further comprise a receiving unit 401, which is configured to receive an edition made on the information of the corresponding contacts in the media information.

Figure 5:
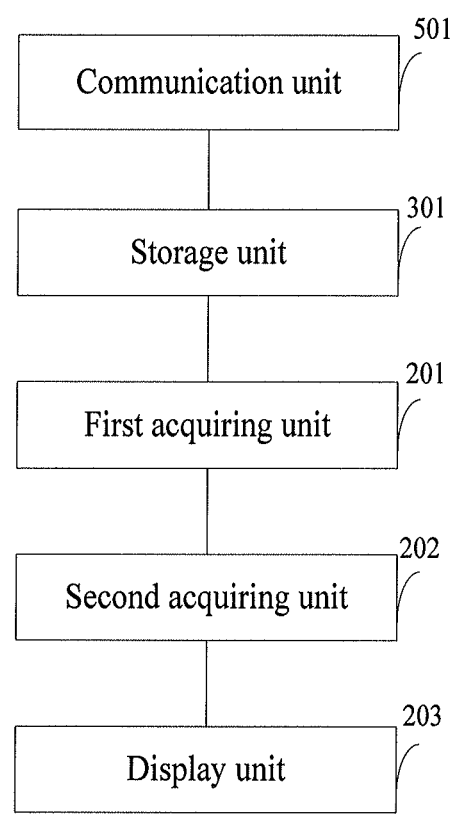
FIG. 5 illustrates a diagram of another mobile communication terminal according to an embodiment.

As shown in FIG. 5, another terminal according to an embodiment can further comprise a communication unit 501, which is configured to initiate a call or send a short message to corresponding contacts in the media information through the media information.

The embodiment of the mobile communication terminal according to the present invention will be specifically illustrated by example of a mobile phone user associating contact A with photos B1-Bn, audios C1-Cn and videos D1-Dn hereinafter.

The mobile phone user associates the photos B1-Bn, the audios C1-Cn and the videos D1-Dn with the contact A by the storage unit 301. When associating the photos B1-Bn, the audios C1-Cn and the videos D1-Dn with the contact A, the user associates the photos B1-Bn, the audios C1-Cn and the videos D1-Dn with a telephone number of the contact A. When the telephone number of the contact A is changed, the mobile phone user edits the telephone number of the contact A by the receiving unit 401 and meanwhile modifies an association mode from merely including the telephone number of the contact A to including the telephone number and a name of the contact A. When desiring to learn all the media files associated with the contact A, the user acquires information of the contact A, such as the telephone number of the contact A, by the first acquiring unit 201; the second acquiring unit 202 searches for media files in the mobile phone and acquires the media files matched with the telephone number of the contact A according to the telephone number of the contact A; and the display unit 203 displays the media files matched with the telephone number of the contact A.

At the same time, when browsing the photos B1-Bn, the user can acquire the telephone number of the contact A by the photos B1-Bn; and the communication unit 501 can initiate a call or send a short message to the contact A through the telephone number of the contact A to which the photos B1-Bn correspond.

It can be seen from the above description that the embodiment of the terminal according to the present invention enables a mobile communication terminal user to search for media information related to a contact through the contact and meanwhile can further view information of the contact associated with the media information through the media information, by associating media information with contacts.

Finally, it should be illustrated that the above embodiments are merely exemplary, and are not intended to limit the claims. Although the embodiments have been illustrated in detail, those of ordinary skill in the art should understand that modifications can still be made to the technical solutions recited in various embodiments described above, or equivalent substitutions can still be made to a part of technical features thereof, and these modifications or substitutions will not make the essence of the corresponding technical solutions depart from the spirit and scope of the claims.

What is claimed is:

1. A method for displaying related information in a mobile communication terminal, the mobile communication terminal having a media file database including media information comprising media files and a plurality of fields associated with the media information, the method comprising:

storing information of one or more corresponding contacts in a field of respective corresponding media information when storing the media information;

acquiring information of a contact stored in the mobile communication terminal;

searching for media information in the mobile communication terminal according to the information of the contact;

acquiring media information matched with the information of the contact; and displaying the media information matched with the information of the contact;

displaying information of a contact associated with the media information, which is acquired through the media information, and sending a short message or initiating a call to the associated contact through the media information;

wherein the information of the one or more contacts comprises at least one of a name, a nick name and a telephone number of the contact;

wherein the telephone number of the associated contact is acquired through the media information; and the call is initiated or the short message is sent to the associated contact through the acquired telephone number of the associated contact; and editing the information of the corresponding contacts in the media information.

2. The method according to claim 1, wherein editing of the information of the corresponding contacts in the media information comprises at least one of:

adding information of one or more other contacts;

deleting information of one or more contacts which have been stored in the media information; and modifying information of one or more contacts which have been stored in the media information.

3. The method according to claim 1, wherein the media information comprises at least one of: a photo, an audio file, a video file, and a media file database.

4. A mobile communication terminal, comprising:

a first acquiring unit configured to acquire information of a contact stored in the mobile communication terminal;

a second acquiring unit configured to search for media information in the mobile communication terminal according to the information of the contact, and to acquire media information matched with the information of the contact;

a storage unit configured to store, in a media file database, media information comprising media files and a plurality of fields associated with the media information and storage unit configured to store information of one or more contacts in a field of respective corresponding media information when storing the media information;

a display unit configured to display the media information matched with the information of the contact; and a communication unit configured to send a short message or initiate a call to a contact associated with the media information through the media information;

wherein the display unit displays information of the associated contact, which is acquired through the media information;

wherein the information of the contact comprises at least one of a name, a nick name and a telephone number of the contact;

wherein the telephone number of the associated contact is acquired through the media information; and the communication unit initiates a call or sends the short message to the associated contact through the acquired telephone number of the associated contact; and;

wherein the storage unit comprises a receiving unit configured to receive an edition made on the information of the corresponding contacts in the media information.

* * * * *